April 11, 1950 — T. C. WARD — 2,503,856

LIVE MINNOW AND FISH CARRIER

Filed Dec. 26, 1944

Inventor
Thomas C. Ward,

By Clarence A. O'Brien
and Harvey B. Jacobson
Attorneys

Patented Apr. 11, 1950

2,503,856

UNITED STATES PATENT OFFICE 2,503,856

LIVE MINNOW AND FISH CARRIER

Thomas C. Ward, Mount Pleasant, Tex.

Application December 26, 1944, Serial No. 569,825

1 Claim. (Cl. 119—5)

The present invention relates to new and useful improvements in containers for live minnows and fish adapted for transporting the same and embodying means constructed as a part thereof to cause an agitation of the water within the carrier to prolong the life of the fish therein.

An important object of the present invention is to provide a live minnow and fish carrier of this character designed particularly for use in transporting the fish in a moving vehicle, the carrier being constructed to produce a rocking motion thereof during the travel of the vehicle whereby to cause splashing of the water therein and thus pick up oxygen and supply the same to the water in order to prolong the life of a fish.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
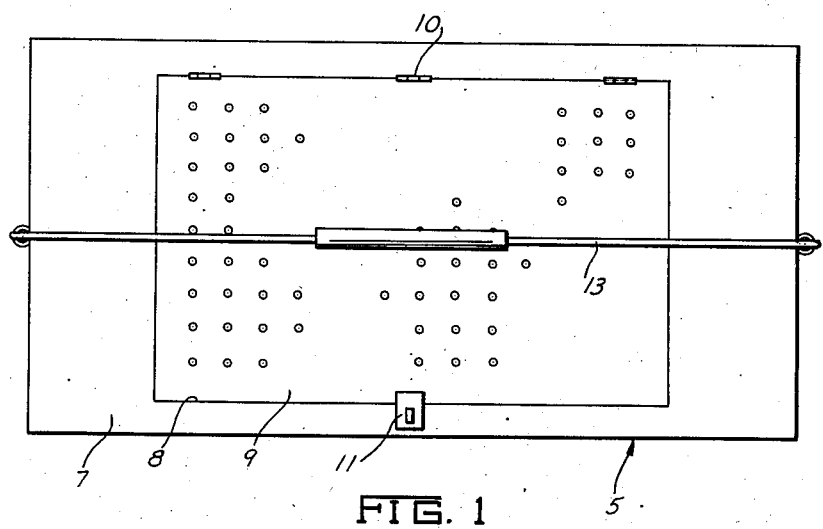
Figure 1 is a top plan view.
Figure 2:
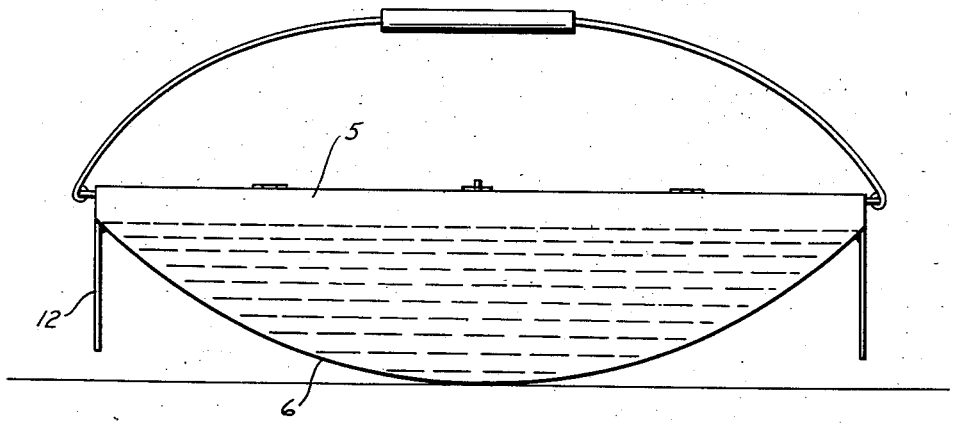
Figure 2 is a side elevational view.
Figure 3:
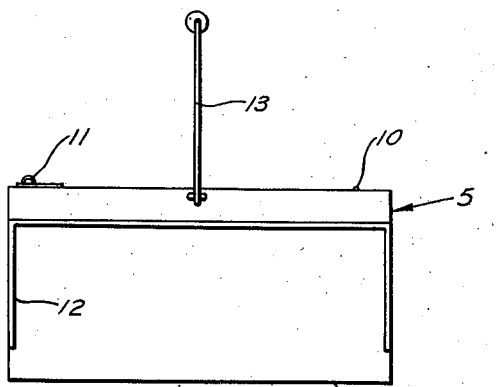
Figure 3 is an end elevational view.

Referring now to the drawings in detail wherein for the purpose of illustration I have disclosed a preferred embodiment of the invention, the numeral 5 designates a container adapted to hold water for live minnows or fish placed in the container.

The bottom of the container is rounded from one end of the container 1 to the other so that when the container is carried in a vehicle, the rounded bottom of the container will produce a rocking motion thereof to cause a forward and backward surging motion of the water.

A top 7 closes the top of the container at the ends and side portions thereof and is provided with an opening 8 which is closed by a perforated lid 9, the lid being hinged as at 10 along one side edge of the container and is releasably secured in closed position by a catch device 11 of conventional construction at the opposite side of the container.

The curved bottom 6 terminates at its end portion slightly below the top 7 so that during the backward and forward surging motion of the water the same will splash against the top and end of the container to thus pick up oxygen from the air and supply the same to the water, the replenishing of the oxygen in the water being essential to prolonging the life of the fish contained therein.

A pair of legs 12 extend downwardly at each end of the container at the junction of the curved bottom 6 with the end walls thereof, the lower ends of the legs terminating above the lowermost portion of the curved bottom 6 so as not to interfere with the rocking of the container, but will serve as a sudden stop to limit the extent of the rocking motion of the container and thus increase the splashing and surging motion of the water therein.

A handle 13 is attached to the container to assist in carrying the same.

It will be understood that the container may be constructed of any desired size either for use for carrying by hand when removed from the transporting vehicle, or may be constructed of a size to carry large quantities of live minnows and fish by a truck.

It is believed that the details of construction and manner of use of the device will be readily understood from the foregoing without further detailed explanation.

Having thus described the invention, what I claim is:

A container for live fish comprising an elongated water receptacle having a flat top with a relatively smaller perforated closure lid centered therein, said receptacle having a bottom curved longitudinally of the receptacle to form a rocker for the receptacle, said bottom curving close to said top at the ends of the receptacle to cause water to surge in the receptacle against said top when the receptacle is rocked and to splash across said perforated lid to pick up oxygen through the perforations of the lid, and stops on the ends of the receptacle for limiting rocking thereof.

THOMAS C. WARD.

REFERENCES CITED

The following references are of record in the file of this patent:

UNITED STATES PATENTS

| Number | Name | Date |
|---|---|---|
| 372,124 | Craig | Oct. 25, 1887 |
| 471,131 | Miles | Mar. 22, 1892 |
| 734,693 | Fraley | July 28, 1903 |
| 1,662,947 | Banker | Mar. 20, 1928 |
| 1,914,473 | Wilson | June 20, 1933 |